United States Patent [19]
Vogel

[11] 3,805,122
[45] Apr. 16, 1974

[54] SEMICONDUCTOR DISC ASSEMBLY PROVIDING PREDETERMINED COMPRESSIVE FORCE AGAINST OPPOSITE FACES OF THE DISC BY CLAMPED HEAT-CONDUCTIVE BODIES

[75] Inventor: Xaver Vogel, Ennetturgi, Switzerland

[73] Assignee: Brown Boveri & Company Limited, Baden, Switzerland

[22] Filed: Nov. 28, 1972

[21] Appl. No.: 310,150

[30] Foreign Application Priority Data

Dec. 3, 1971 Switzerland ....................... 17592/71

[52] U.S. Cl. ...... 317/234 R, 317/234 A, 317/234 P
[51] Int. Cl. ............................ H01l 3/00, H01l 5/00
[58] Field of Search .................. 317/234, 1, 4, 6, 11

[56] References Cited

UNITED STATES PATENTS 3,651,383 3/1972 Livezey et al. .................. 317/234 P

FOREIGN PATENTS OR APPLICATIONS 60,097 5/1968 Germany ......................... 317/234 P
316,534 10/1969 Sweden .......................... 317/234 P

*Primary Examiner*—Andrew J. James
*Attorney, Agent, or Firm*—Pierce, Scheffler & Parker

[57] ABSTRACT

A semiconductor unit which comprises a semiconductor disc assembled between two heat-conducting bodies and which are pressed into contact with opposite faces of the disc by means of clamping bolts which pass through bores in the heat-conducting bodies and terminate in a bridging yoke. A compression spring interposed between the yoke and the adjacent heat-conducting body serves to establish the compressive force existing between the heat-conducting bodies and the semiconductor disc, and the amount of effective force stored in the compressed spring is set by means of a screw bolt and nut arrangement on which the spring is secured to the yoke in a sub-assembly operation and compressed to a predetermined degree established by a stop on the nut which is engageable with the yoke as the nut is tightened on the bolt.

4 Claims, 2 Drawing Figures

Figure 1:
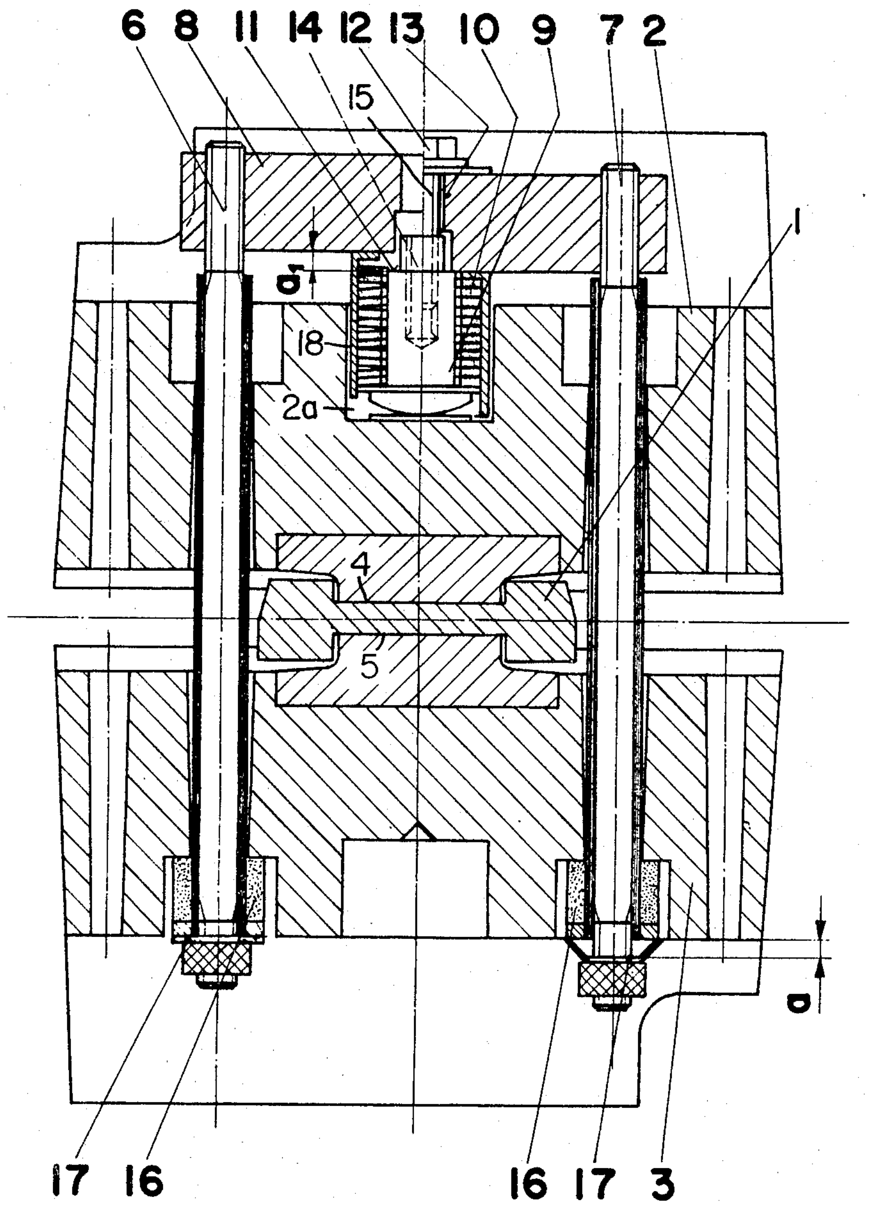

SEMICONDUCTOR DISC ASSEMBLY PROVIDING PREDETERMINED COMPRESSIVE FORCE AGAINST OPPOSITE FACES OF THE DISC BY CLAMPED HEAT-CONDUCTIVE BODIES

The present invention relates to an improvement in the construction of a semiconductor unit formed by disc-shaped semiconductor element which is clamped by clamping bolts under pressure between two solid, electrically conductive, heat-conducting bodies which serve to conduct heat away from the semiconductor element during its operation as well as form electrodes to which the lead-in terminals of the power supply are connected. The invention also concerns an improved method for assembling the semiconductor unit.

Semiconductor units of the above-mentioned type are known in which the clamping force required for satisfactory heat-transfer and current-conduction is established by tightening the clamping bolts to a so-called "starting" torque. This starting torque is, however, subject to numerous factors which cannot be readily and precisely defined, with the result that a precise adjustment of the tension in the clamping bolts becomes extremely difficult, and subsequent measurement and standardization becomes almost impossible. In order to avoid this disadvantage, it is also known to include in the clamping arrangement an arrangement of springs which have a fixedly adjustable travel. However, this specific arrangement has the disadvantage that during assembly of the individual component parts of the semiconductor unit, a very great and undesirable torque is exerted on the semiconductor element.

Another solution to the problem is disclosed in my co-pending U.S. Pat. application Ser. No. 180,415 filed Sept. 14, 1971 and which has now matured into U.S. Pat. No. 3,740,618, granted June 19, 1973. In accordance with the disclosure in that application, one or more disc-shaped semiconductor elements are clamped under pressure between two metallic, electrically conductive heat-conducting bodies by means including a pair of clamping bolts which pass through bores provided in the heat-conducting bodies in a direction perpendicular to the plane of the semiconductor disc, a yoke secured to and bridging the clamping bolts at one side of one of the heat-conducting bodies, and a compression spring interposed between the yoke and the adjacent heat-conducting body. This spring is stressed in compression in a predetermined value determined by a stop member during a sub-assembly operation, so that after the assembly operation of semiconductor disc, heat-conducting bodies, yoke and clamping bolts has been completed, the force stored in the compressed spring functions to determine the magnitude of the initial clamping force when the semiconductor is in the cold, i.e. non-operating state. Moreover, the interposed spring permits a certain degree of thermal expansion of the semiconductor-heat-conducting body assembly to take place in the axial direction along the bolts in the direction of the yoke accompanied by compression of the spring when the semiconductor unit is in operation.

It has been found that the assembly of a semiconductor unit as disclosed in the aforesaid pending application can be greatly simplified if there is arranged, between the compression spring and the heat-conducting body adjacent the yoke, an intermediate part which is movably guided in a direction perpendicular to the disc plane of the semiconductor element and against the force exerted by the compression spring, and which is provided with the stop that determines the amount to which the spring is compressed in the cold state of the semiconductor unit. This intermediate part includes a threaded recess which is engaged by the threaded end of a screw bolt the shank of which passes through a bore in the yoke. As the screw bolt is tightened, the intermediate part is drawn in the direction of the yoke simultaneously compressing the spring until the stop provided on the intermediate part makes contact with the yoke.

This sub-assembly of the yoke, compression spring and the intermediate part is then assembled with the semiconductor element, the two heat-conducting bodies and the clamping bolts, there being provided on each of the clamping bolts a spring washer, and the clamping bolts are then screwed into threaded bores in the yoke until all play between the spring washers and the bolt head has been taken up. The screw bolt is then backed off with the result that the pressure stored in the compressed spring then becomes effective to force the yoke away from the adjacent heat-conducting body accompanied by a flattening of the spring washers on the clamping bolts and separation of the yoke from the stop on the intermediate part. This is then the so-called cold state of the semiconductor unit. During operation of the semiconductor unit axial expansion takes place and is accommodated by compression of the spring up to a limit point where the stop on the intermediate part will once again make contact with the yoke.

Figure 2:
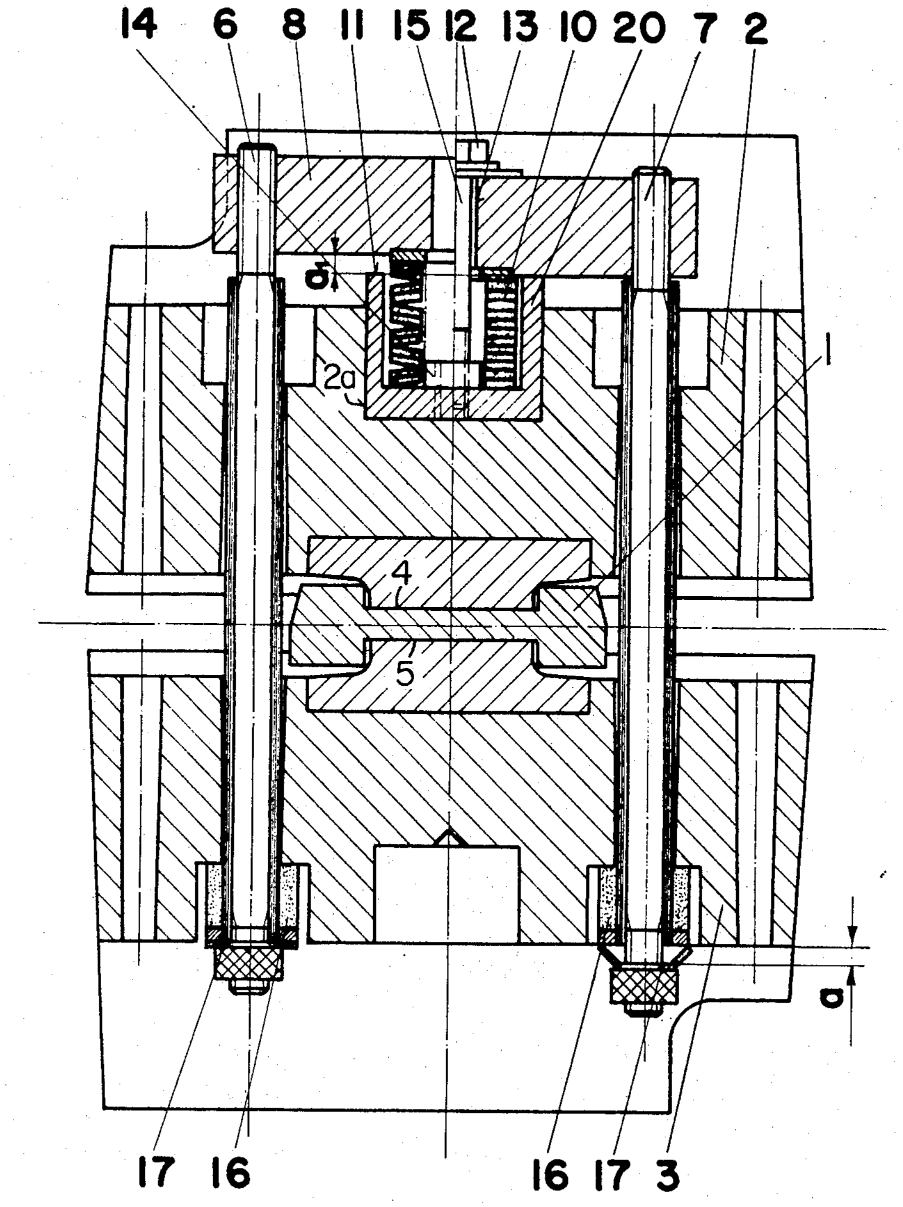

The foregoing as well as other objects and advantages inherent in the invention will become more apparent from the following detailed description of two embodiments thereof when considered with the accompanying drawings wherein FIGS. 1 and 2 are views of these embodiments in vertical central section.

With reference now to FIG. 1 of the drawing, the semiconductor unit consists essentially of one or more semiconductor elements 1 having a generally disc form providing opposite parallel faces 4,5 with are contacted under pressure by corresponding faces of metallic, heat-conducting bodies 2, 3 which serve to remove heat from the semiconductor element while the latter is in operation, and also being electrically conductive serve as lead-ins for the power supply applied between the opposite faces of the semiconductor element. Clamping bolts 6, 7 which are arranged parallel to each other and perpendicular to the opposite faces of the semiconductor element extend through aligned bores provided respectively in the heat-conducting bodies and are interconnected at their ends by a bridging yoke 8 into which they are threaded.

Located intermediate the yoke 8 and the heat-dissipating member 2 is a packet of annular cup springs 10 which are carried on the shank of a headed nut 9 which constitutes the "intermediate part" above referred to. The lower end of the spring packet 10 which is seated in a recess 2*a* in the body 2 is stopped by the head of nut 9 which bears against the bottom of this recess, and the upper end of the spring packet bears against an inwardly turned end flange of a guide sleeve 18 which surrounds the spring packet which in turn bears against the underface of the yoke 8.

The shank portion of nut 9 extends partially into a stepped axial bore 13 in the yoke 8 and is provided with a threaded recess 14 extending inwardly from the end thereof for receiving the threaded shank of a screw bolt 15 which when tightened by turning the bolt head 12 which bears against the yoke 8 serves to draw the nut 9 upwardly to intially compress the spring packet 10 to the position illustrated in the right half of FIG. 1.

The shank of nut 9 is also provided with a stop shoulder 11 which is adapted to contact the yoke as the screw bolt 15 is tightened and establish a stop preventing further compression of the spring packet.

After the spring packet 10 has been secured to the yoke 8 by means of the threadedly interconnected nut 9 and bolt 15 and established in the position indicated in the right half of FIG. 1, the semiconductor disc 1 and the heat-conducting bodies 2 and 3 are assembled in the position shown in FIG. 1, the clamping bolts 6, 7 are then inserted through insulating sleeves 16 lining the the bores in the heat-conducting bodies 2, 3, and the upper ends of the bolts are then screwed into the threaded bores provided in yoke 8. It will be noted that a cup spring 17 is provided on each bolt 6, 7 at the lower bolt head end and that the cup spring 17 bears against a lower enlarged end of the insulating sleeve 16 seated in a recess within the lower heat-conducting body 3.

The bolts 6, 7 are tightened to the point where the cup springs 17 touch the lower faces of the enlarged ends of the insulating sleeves 16 and the upper faces of these enlarged ends touch the bottoms of the recesses provided in the lower heat-conducting body 3. In this manner, all longitudinal play of the bolts 6, 7 is taken up but care is taken that the cup springs 17 are not deformed in the sense of flattening, i.e. the position indicated in the right half of FIG. 1. The screw bolt 15 is now loosened with the result that the force stored in the spring packet 10 by its compression is then released in the upward direction to its sleeve 18 which then pushes the yoke 8 in the direction away from the heat-conducting body 2 until cup springs 17 on the clamping bolts have been flattened, which is the position indicated in the left half of FIG. 1. This also effects separation of the stop shoulder 11 from the underface of yoke 8 by a axial take-up distance *a'* equal to distance *a* for the clamping bolts 6,7 which represents the amount of the elastic deformation of cup springs 17 in the axial direction of the clamping bolts 6, 7.

The position of the components shown at the left half of FIG. 1 corresponds to the cold, i.e. the non-operating state of the semiconductor assembly. During operation of the semiconductor assembly, axial expansion takes place as a result of the heat which is created which results in an upwardly directed force on nut 9 which raises the latter until the initial "cold" distance *a'* between the stop shoulder 11 and the bottom of yoke 8 has been reduced to zero.

This improved construction thus makes it feasible to precisely adjust, without use of a measuring instrument, and in a very simple manner, the compression force acting upon the semiconductor element 1 and without the danger of an undesirable torque acting upon the semiconductor element 1 during assembly of the unit.

Moreover, since the screw-bolt 15, nut 9 and the cup spring packet 10 are located precisely in the center of yoke 8 and in the middle between the two clamping bolts 6, 7, the semiconductor element 1 will always be subjected to a stress which is distributed uniformly over its entire bearing area, even during assembly operations, a fact which is most important for avoidance of any damage to the semiconductor element.

In a somewhat modified embodiment, as illustrated in FIG. 2, the nut member which is engaged by the screw bolt 15 to effect compression of the spring packet 10 instead of passing through the spring packet is constituted by a cup-shaped member 20 inserted in the recess 2*a* provided in the heat-conducting body 2 and which receives the spring packet 10. The upper, open end of the cup-shaped member 20 is adapted to engage the underface of yoke 8 and establish the stop 11, and the base part of the cup-shaped member is provided with an upstanding portion which is internally threaded at 14 to receive the lower threaded end of the screw bolt 15. However, the principle of operation is the same as that of FIG. 1. In the initial phase of the assembly operations, screw bolt 15 is tightened by threading into the cup-shaped member 20 which draws the latter upwardly against the underface of yoke 8 and compresses the spring packet 10. Thereafter the initial assembly of the components 8, 10, 15 and 20 is applied to the bolts 6, 7 which are tightened to the point where the cup springs 17 on these bolts make contact but are not deformed axially so that all components of the assembly are then in the positions illustrated in the right half of FIG. 2. Thereafter, the bolt 15 is loosened, whereupon the force stored within the spring pack 10 is released in an upward direction pushing the yoke 8 away from the heat-conducting member 2 and thereby applying tensional force to bolts 6 and 7 which results in flattening of cup springs 17 and upward displacement of these bolts through a distance *a* and the establishment of a like distance *a'* between the upper end of the cup-shaped member 20 and the underface of yoke 8, so that all of the components of the semiconductor assembly assume the positions indicated respectively in the left half of FIG. 2, which corresponds to the "cold," i.e. the non-operating state of the semiconductor element. During operation of the semiconductor element, the heat created leads to thermal expansion in the axial direction which is then limited to travel of the cup-shaped member 20 through the distance *a'*.

I claim:

1. A semiconductor assembly comprising a semiconductor element in disc form, a pair of heat-conductive bodies in contact respectively with opposite faces of said semiconductor element for removing heat therefrom produced during operation of the assembly, a yoke located adjacent a first one of said heat-conductive bodies, a plurality of parallel spaced clamping bolts interconnected at corresponding ends thereof by said yoke, said bolts extending through bores provided in said heat-conductive bodies in a direction perpendicular to the plane of said semiconductor element for applying a compressive force to opposite faces thereof via said heat-conductive bodies and yoke, axial take-up means located on each of said clamping bolts at one end thereof, a threaded member mounted by said yoke and extending therefrom in the direction of said first heat conductive body for displacement in a direction perpendicular to the plane of said semiconductor element, spring means carried by said threaded member and which are compressed upon displacement of said threaded member towards said yoke, one end of said spring means bearing against an end of said threaded member which in turn is adapted to bear against said first heat-conductive body and the other end of said spring means bearing against said yoke thereby to enable a compressive force to be transmitted from said yoke through said spring means and said first heat-conductive body to said semiconductor element, said threaded member being provided with stop means thereon engageable with said yoke for predetermining the degree to which said spring means is compressed upon displacement of said threaded member towards said yoke, said yoke and threaded member together with said spring means constituting a sub-assembly which is then united with said end portions of said clamping bolts, said threaded member being thereafter released from its stopped position in the direction away from said yoke thereby to permit the compressive force stored within said spring means to be released and effect a displacement of said yoke in a direction away from said first heat-conductive body to the extent permitted by said axial take-up means and which is equal to the displacement incurred by said threaded member in moving in the opposite direction from its initial position to the stopped position established by contact of the stop means thereon with said yoke.

2. A semiconductor assembly as defined in claim 1 wherein said axial take-up means located on each of said clamping bolts is constituted by a cup spring which is deformed from a non-stressed state to a flattened state upon the release of said threaded member from its stopped position against said yoke and simultaneous release of the force stored in said compressed spring means which in turn acts through said yoke and said first heat-conductive body to produce a corresponding increase in the tensional force applied to said clamping bolts.

3. A semiconductor assembly as defined in claim 1 wherein said threaded member is constituted by a threaded bolt and nut arrangement, said nut being seated within a recess provided in said first heat-conductive body and said nut including a head portion having one side thereof in engagement with said first heat-conductive body and the other side in engagement with one end of said spring means, and a shank portion threadedly connected with said bolt, said shank portion being provided with said stop means which is engageable with said yoke to limit compression of said spring means.

4. A semiconductor assembly as defined in claim 1 wherein said threaded member is constituted by a threaded bolt and nut arrangement, said nut being seated within a recess provided in said first heat conductive-body and having a cup-shaped configuration in which said compression spring means is seated, the open end of said cup-shaped nut providing said stop means which is engageable with said yoke to limit compression of said spring means, and said nut further including a central portion located within said spring means and which is threadedly connected with said bolt.

* * * * *